United States Patent
Keskar et al.

(10) Patent No.: US 11,520,838 B2
(45) Date of Patent: Dec. 6, 2022

(54) SYSTEM AND METHOD FOR PROVIDING RECOMMENDATIONS OF DOCUMENTS

(71) Applicant: Innoplexus AG, Eschborn (DE)

(72) Inventors: Abhijit Keskar, Pune (IN); Om Prakash, Dhanbad (IN)

(73) Assignee: Innoplexus AG, Eschborn (DE)

( * ) Notice: Subject to any disclaimer, the term of this patent is extended or adjusted under 35 U.S.C. 154(b) by 284 days.

(21) Appl. No.: 16/367,610

(22) Filed: Mar. 28, 2019

(65) Prior Publication Data
US 2020/0097509 A1    Mar. 26, 2020

Related U.S. Application Data

(60) Provisional application No. 62/664,444, filed on Apr. 30, 2018.

(51) Int. Cl.
| | | |
|---|---|---|
| *G06F 16/93* | (2019.01) | |
| *G06F 16/9535* | (2019.01) | |
| *G06F 16/951* | (2019.01) | |
| *G06Q 30/06* | (2012.01) | |
| *G06Q 30/02* | (2012.01) | |

(52) U.S. Cl.
CPC ............ *G06F 16/93* (2019.01); *G06F 16/951* (2019.01); *G06F 16/9535* (2019.01); *G06Q 30/02* (2013.01); *G06Q 30/0631* (2013.01)

(58) Field of Classification Search
CPC .... G06F 16/93; G06F 16/9535; G06F 16/951; G06F 16/953; G06F 16/9532; G06F 16/9538; G06F 16/9536; G06Q 30/02; G06Q 30/0631
See application file for complete search history.

(56) References Cited

U.S. PATENT DOCUMENTS

| | | | |
|---|---|---|---|
| 2005/0210009 A1* | 9/2005 | Tran .................... | G06Q 10/10 |
| 2006/0010323 A1* | 1/2006 | Martin ................. | H04L 63/101 |
| | | | 713/171 |

FOREIGN PATENT DOCUMENTS

WO    WO-2005114379 A2 * 12/2005 ........... G06F 16/335

* cited by examiner

*Primary Examiner* — William B Partridge
*Assistant Examiner* — Erich Alexander Fischer
(74) *Attorney, Agent, or Firm* — Ziegler IP Law Group, LLC (57) ABSTRACT

A system that provides recommendations of documents to a user, the system including a server arrangement, and a database arrangement that stores documents, wherein the server arrangement: receives identification details of the user, obtains prior work associated with the user, determines a user classification of the user based on: the identification details of the user, the prior work associated with the user, and an activity data of the user, determines a document classification for the documents based on a metainformation pertaining to the documents, determines a relevance factor for the documents with respect to the user based on the document classification of the documents, the user classification of the user, and activity data relating to the documents of a plurality of users with similar user classification as the user, and provides recommendations of documents to the user based on relevance factors of the documents.

11 Claims, 2 Drawing Sheets

SYSTEM AND METHOD FOR PROVIDING RECOMMENDATIONS OF DOCUMENTS

CROSS-REFERENCE TO RELATED APPLICATIONS

This is a non-provisional patent application based upon a provisional patent application no. U.S. 62/664,444 as filed on Apr. 30, 2018, and claims priority under 35 U.S.C. 199(e).

TECHNICAL FIELD

The present disclosure relates generally to recommendation systems; and more specifically, to recommendation systems that provide recommendations of documents to a user. Furthermore, the present disclosure relates to method of providing recommendations of documents to a user.

BACKGROUND

With the advent of global interconnected network systems, there has been an exponential growth with regard to transaction of products. Moreover, the transaction of products available online enables progressive functioning of organizations. However, due to mere abundance of products on multiple platforms, as well as continuously evolving nature of the products, a user may not be able to identify desired products in a specific scenario. Consequently, the user may not participate in a transaction or may be discontent with the transaction performed.

Typically, recommendation systems are employed to allow automated recommendation of products to the user thereby enabling a user to identify desired products. Specifically, the recommendation systems recommend products that are likely to be of interest to the user. More specifically, the recommendation systems identify a profile of the user and recommends the products accordingly.

In an embodiment, the recommendation systems recommend documents for online transactions to the user based on a profile developed for the user. In an example, it is desired that findings of researches, discoveries and innovations be shared among the research community for a progressive development in respective fields thereof. Typically, the findings of researches, discoveries and innovations are published by their authors in form of articles, theses, journals, research papers and so forth. Furthermore, in order to create synergy among research community, recommendation of most relevant documents/information about experiments needs to be facilitated in an easy to use manner. However, owing to the lack of appropriate recommendations, the users end up doing experiments that have been already done by some other research organizations (or personnel).

Conventionally, the recommendation systems operate by attempting to identify products similar to products that are of interest to the user. However, such techniques do not provide a mechanism for evaluating a quality or a popularity of the identified products. Moreover, such techniques do not consider the products having limited parsable information related thereto. Consequently, such recommendation systems hinder in identification of products and may result in user missing on products that the user would have been interested in. Subsequently, this may result in loss of profits for user as well as a user offering the product for transaction.

Furthermore, the recommendation systems may recommend products to users based on interest of a community of similar users, without analyzing the products. However, such recommendation systems rely stiffly on interests of the community of similar users. Consequently, such recommendation systems tend to be poorly suited for recommending products to users having varying taste. Moreover, such recommendation systems may not recommend a new product to the user owing to lack of information related to the new product from the community of similar users. Additionally, generating real-time recommendations for the user in response to request from the user, on the basis of the community of similar users may be time-consuming and shallow thereby giving poor recommendations to the user. Furthermore, the conventional recommendation techniques may not consider the current preference of the user and/or the current preference of the community of similar users. Subsequently, the identified products for recommendations may not incorporate latest developments and trends leading to poor recommendations.

Therefore, in light of the foregoing discussion, there exists a need to overcome the aforementioned drawbacks associated with the conventional recommendation systems.

SUMMARY

The present disclosure seeks to provide a system, that when operated, provides recommendations of documents to a user. The present disclosure also seeks to provide a method of providing recommendations of documents to a user. The present disclosure seeks to provide a solution to the existing problem of recommendation systems that lack close analysis of characteristic features of the user and the documents while providing recommendations of documents to the user. An aim of the present disclosure is to provide a solution that overcomes at least partially the problems encountered in prior art, and provides a platform that provides most suitable recommendations of documents to the user, based on characteristic features of the user and the documents.

In one aspect, an embodiment of the present disclosure provides a system, that when operated, provides recommendations of documents to a user, the system comprising a server arrangement, and a database arrangement that stores a plurality of documents, wherein the server arrangement:
  receives, from the user, identification details of the user;
  obtains prior work associated with the user;
  determines, a user classification of the user, wherein the user classification of the user is determined based on at least one of: the identification details of the user, the prior work associated with the user, and an activity data of the user;
  determines, a document classification for each of the plurality of documents, wherein the document classification for a given document is determined based on a metainformation pertaining to the given document;
  determines, a relevance factor for each of the plurality of documents with respect to the user, wherein the relevance factor of a given document is determined based on the document classification of the given document, the user classification of the user, and activity data relating to the given document of a plurality of users with similar user classification as the user; and
  provides recommendations of at least one document from the plurality of documents to the user based on relevance factors of the plurality of documents.

In another aspect, an embodiment of the present disclosure provides a method of providing recommendations of documents to a user, wherein the method is implemented via a system comprising a server arrangement, and a database arrangement that stores a plurality of documents, the method comprising:

receiving, from the user, identification details of the user;
obtaining prior work associated with the user;
determining, a user classification of the user, wherein the user classification of the user is determined based on at least one of: the identification details of the user, the prior work associated with the user, and an activity data of the user;
determining, a document classification for each of the plurality of documents, wherein the document classification for a given document is determined based on a metainformation pertaining to the given document;
determining, a relevance factor for each of the plurality of documents with respect to the user, wherein the relevance factor of a given document is determined based on the document classification of the given document, the user classification of the user, and activity data relating to the given document of a plurality of users with similar user classification as the user; and
providing recommendations of at least one document from the plurality of documents to the user based on relevance factors of the plurality of documents.

Embodiments of the present disclosure substantially eliminate or at least partially address the aforementioned problems in the prior art, and enables providing most suitable recommendations of the documents that are closely related to the characteristic features of the user.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system, that when operated, provides recommendations of documents to a user, the system comprising a server arrangement, and a database arrangement that stores a plurality of documents, wherein the server arrangement:

receives, from the user, identification details of the user;
obtains prior work associated with the user;
determines, a user classification of the user, wherein the user classification of the user is determined based on at least one of: the identification details of the user, the prior work associated with the user, and an activity data of the user;
determines, a document classification for each of the plurality of documents, wherein the document classification for a given document is determined based on a metainformation pertaining to the given document;
determines, a relevance factor for each of the plurality of documents with respect to the user, wherein the relevance factor of a given document is determined based on the document classification of the given document, the user classification of the user, and activity data relating to the given document of a plurality of users with similar user classification as the user; and
provides recommendations of at least one document from the plurality of documents to the user based on relevance factors of the plurality of documents.

In another aspect, an embodiment of the present disclosure provides a method of providing recommendations of documents to a user, wherein the method is implemented via a system comprising a server arrangement, and a database arrangement that stores a plurality of documents, the method comprising:

receiving, from the user, identification details of the user;
obtaining prior work associated with the user;
determining, a user classification of the user, wherein the user classification of the user is determined based on at least one of: the identification details of the user, the prior work associated with the user, and an activity data of the user;
determining, a document classification for each of the plurality of documents, wherein the document classification for a given document is determined based on a metainformation pertaining to the given document;
determining, a relevance factor for each of the plurality of documents with respect to the user, wherein the relevance factor of a given document is determined based on the document classification of the given document, the user classification of the user, and activity data relating to the given document of a plurality of users with similar user classification as the user; and
providing recommendations of at least one document from the plurality of documents to the user based on relevance factors of the plurality of documents.

The aforesaid system for providing recommendations of documents to a user and the aforesaid method of providing recommendations of documents to a user as described in the present disclosure provides a platform that recommends most relevant documents to the user for transaction thereof. Specifically, the system and method described herein identifies the most relevant documents for the user based on the relevance factor. Pursuant to embodiments of the present disclosure, the relevance factor is determined for a given document with respect to the user.

Typically, techniques such as content-based filtering of the user, content-based filtering of the given document, collaborative-filtering of the user, and collaborative-filtering of the given document are employed for providing recommendations to the user. Pursuant to embodiments of the present disclosure, a plurality of dynamic factors such as prior work performed by the user, geographical location associated with the user, activity data of the user and protocols employed by the user for performing the prior work are further analyzed to determine the relevance factor for the given document with respect to the user. Beneficially, utilization of such techniques along with the dynamic factors, for determining the relevance factor, results in identification of most relevant documents for providing recommendation to the user in real-time. Moreover, the system and method disclosed herein neither stores a copy of the document locally nor stores it in a database. This potentially prevents any fraudulent activity, for example, such as a misuse of the document by unauthorized parties. In other words, the aforesaid system and method reduce the risk of data misuse, data theft and other threats that are often caused due to a lack of security in conventional recommendation systems.

Furthermore, the system and the method described herein utilizes world knowledge available on various public platforms, to determine various factors employed for determining the relevance factor.

It will be appreciated that the aforesaid system and the aforesaid method can be employed to provide recommendation of a singular document or multiple documents from the plurality of documents at a given time. The multiple documents could comprise documents having same document classification or documents having different document classification. Moreover, the system and the method are employed to provide recommendation of singular document or multiple documents to a plurality of users at a given time.

Optionally, the system described herein is implemented by way of a trusted software application, that when executed by the user, provides the recommendations of documents to the user. Optionally, in such case, the trusted software application is received (for example, downloaded) from the server arrangement or a trusted third party. The trusted third party is a publicly-accessible digital distribution platform, for example, such as Google Play®, the App Store® (for iOS®) and the like.

The system, when operated, provides recommendations of documents to the user. Throughout the present disclosure, the term "documents" refer to files in which information is recorded or stored. Specifically, the documents comprise written, drawn, presented, or memorialized representation of the information. In an embodiment, the documents refer to files in which information relating to observations made in a scientific investigation or experiment is recorded, wherein the observation can be recorded in a form of one or more types of data. Furthermore, examples of various types of data are text data, tabular data, image data, video data and audio data. Thus, documents can be in any suitable file format depending upon the type of data that is stored therein. As an example, the documents comprise a singular type of data. As another example, the documents comprise different types of data, for example, such as a written text, one or more tables, one or more graphs, a set of images, one or more videos, or one or more audio clips.

The system comprises the server arrangement, and the database arrangement that stores the plurality of documents. Throughout the present disclosure, the term "server arrangement" refers to an arrangement of one or more servers that includes one or more processors that performs various operations, for example, as mentioned earlier. Optionally, the server arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the server arrangement can be implemented by way of a single hardware server. The server arrangement can alternatively be implemented by way of a plurality of hardware servers operating in a parallel or distributed architecture. As an example, the server arrangement may include components such as memory, a processor, a network adapter and the like, to store and process information pertaining to the document and to communicate the processed information to other computing components, for example, such as client device executing the system.

It will be appreciated that the plurality of documents may have been authored or co-authored by one or more authors. Moreover, the plurality of documents are uploaded by any one of: the one or more authors, a representative of the one or more authors, or an owner of the document, to perform actions or commercial transactions of each of the plurality of document (for example, such as sale, licensing and so forth).

Pursuant to embodiments of the present disclosure, the system presents a graphical user interface on a client device (as discussed in detail later, herein). Specifically, the graphical user interface of the system allows any one of: the one or more authors, the representative of the one or more authors, or the owner of the document, to submit the plurality of documents and a meta data associated with each of the plurality of documents. Optionally, the meta data associated with each of the plurality of document is submitted in form of a meta file. Moreover, the plurality of documents are stored in the database arrangement of the system.

In an embodiment, the database arrangement may store the plurality of documents having the meta data associated therewith, for various actions or commercial transactions. In another embodiment, the database arrangement may only store the meta data associated with each of the plurality of the documents.

Throughout the present disclosure, the term "database arrangement" refer to an organized body of digital information regardless of the manner in which the data or the organized body thereof is represented. Optionally, the database arrangement may be hardware, software, firmware and/or any combination thereof. For example, the organized body of related data may be in the form of a table, a map, a grid, a packet, a datagram, a file, a document, a list or in any other form. The database arrangement includes any data storage software and systems, such as, for example, a relational database like IBM DB2 and Oracle 9. More optionally, the database arrangement comprises one or more data storage software.

Pursuant to embodiments of the present disclosure, the database arrangement stores the plurality of documents provided by any one of: the one or more authors, a representative of the one or more authors, or an owner of the document. Moreover, the database arrangement may or may not have the meta data associated with each of the plurality of documents stored therein. Optionally, each of the plurality of documents and the meta data associated thereto may be stored in a relational database.

Throughout the present disclosure, the term "uses" refers to, for example, an individual or a representative of a group of individuals or an organization seeking access to the plurality of documents, wherein the user uses the system described herein to perform actions or commercial transactions (for example, such as purchase, lease, rent, and so forth) for consuming the documents.

The server arrangement comprised in the system receives the identification details of the user. Specifically, server arrangement of the system presents a graphical user interface on a client device of the user, to obtain the identification details of the user. It will be appreciated that the graphical user interface allows the user to provide the identification details of the user.

Optionally, one or more forms (having input fields, user selectable button, drop down menus, and so forth) are rendered on the graphical user interface, provided to the user, for receiving the identification details of the user. The user is required to fill the one or more forms to provide the identification details of the user. More Optionally, the identification details of the user comprise information about one or more of: name or unique identifier of the user, academic qualifications of the user, academic institutes from where the user obtained the academic qualifications, research organizations and/or departments to which the user is currently or previously affiliated, areas of expertise of the user, areas of interest of the user, digital libraries where the user have made publications. Additionally, optionally, the identification details of the user may be analyzed to extract geographical location associated with the user, the publications of the user, protocols employed by the user for the publications made, and so forth.

Optionally, the unique identifier of the user may be an identification number of the user, wherein the identification number is issued by an authority, the system, and so forth. Moreover, the information about the academic qualifications of the user include one or more degrees obtained from successful completion of a course of study, by the user. The information about the academic qualifications of the user may be, for example, bachelor's degree, master's degree, diploma degree, a combination thereof, and so forth. Additionally, the information about the academic institutes from where the user obtained the academic qualifications refer to details relating to institutions from where the user obtained the degree for academic qualification such as details relating to a college, a university, a deemed university, and so forth. Furthermore, the research organizations and/or departments to which the user is currently or previously affiliated refers to organizations or departments within organizations where the user was previously connected or is currently connected. In an example, the user may be a member of the organization or the department within the organization. Typically, the areas of expertise of the user may include fields in which the user has developed skills and knowledge while the areas of interest of the user may include fields that the user is enthusiastic about. Furthermore, the digital libraries where the user have made publications may include libraries where the user may have published their prior work such as Elseiver®, Google®, GitHub®, and so forth.

The server arrangement obtains prior work associated with the user. Typically, the term "prior work associated with the user" refers to activities previously performed by the user. Specifically, the prior work refers to published and/or authored or co-authored documents of the user. In an embodiment, the user may be a research personnel working at a research organization. In such case, research works authored or co-authored previously (such as prior to current research work) by the user may be referred as the prior work associated with the user. In an example, the prior work associated with the user comprises published technical documents, for example, pre-clinical reports, clinical reports, scientific articles, theses, granted patents, and published patent applications.

In an embodiment, the user provides the prior work associated with the user, using the graphical user interface provided to the user. In another example, the prior work associated with the user may not be provided by the user. Subsequently, optionally, the server arrangement requests a consent from the user for extracting the prior work associated with the user. In such case, selectable buttons may be provided on the graphical user interface of the user to request the consent from the user. In an example, the consent may be requested by way of a permission message notification. In such case, the permission message notification may include two user selectable buttons (namely, allow button and not allow button) and a permission message 'If you consent to us for extracting your prior work, please click the allow button'. It will be appreciated that the server arrangement extracts the prior work associated with the user from public domain. Optionally, the server arrangement may employ identification details of the user (such as the digital libraries where the user have made publications) to extract the prior work associated with the user.

Optionally, the server arrangement may allow, via the graphical user interface, the user to view and edit the identification details of the user and/or the prior work associated with the user, previously provided by the user. More optionally, the server arrangement collates the identification details of the user and the prior work associated to the user into the meta file stored in the database arrangement of the system.

Optionally, when signing-up for the first time, the user is required to provide one-time information, for example, including identification details of the user and the prior work associated with the user. Moreover, optionally, the server arrangement provides the user, via the graphical user interface of the user, with a Single Sign-On (SSO) feature, based on stored one-time information (namely, identification details of the user and the prior work associated with the user) of the user. Furthermore, the graphical user interface of the user allows the user to input his/her credentials (for example, a user identification and a password) to complete a sign-in procedure. Subsequently, such credentials are stored on the client device of the user, thereby allowing the user to sign-in without a need to input the one-time information every time.

Optionally, the user further validates an authorship of the prior work associated with the user, using the server arrangement. In other words, the user approves an authority over the obtained prior work associated with the user. In such case, the server arrangement provides the user with at least one of:

user selectable buttons, input field, and drop-down menu on the graphical user interface of the user, to validate the authorship of the prior work associated with the user. In an example, the user may be an author of the prior work associated with the user. In another example, the user may be an owner of the prior work associated with the user. In yet another example, the user may be a publisher of the prior work associated with the user.

The server arrangement determines the user classification of the user, wherein the user classification of the user is determined based on at least one of: the identification details of the user, the prior work associated with the user, and the activity data of the user. Throughout the present disclosure, the term "user classification" refers to a segmentation of the user under predefined user classifications, based on parameters associated with the user and reference parameters of each of the predefined user classifications. Specifically, the parameters associated with the user (namely, the identification details of the user, the prior work associated with the user, and the activity data of the user) are compared with reference parameters of each of the predefined user classifications in order to classify the user under one or more user classification from the predefined user classifications. It will be appreciated that the user is classified under a given user classification when the parameters associated with the user are similar to reference parameters of the given user classification.

It will be appreciated that the user classification of the user is determined based on at least one of: the identification details of the user, the prior work associated with the user, and the activity data of the user. In other words, the above-mentioned parameters associated with the user are analyzed to classify the user under the predefined user classifications. Typically, primary user classification of the user is determined based on the identification details of the user (including the name or unique identifier of the user, academic qualifications of the user, academic institutes from where the user obtained the academic qualifications, research organizations and/or departments to which the user is currently or previously affiliated, areas of expertise of the user, areas of interest of the user, digital libraries where the user have made publications). Furthermore, the prior work of the user is analyzed to classify the user under the user classifications having reference parameters similar to the parameters associated with the user. Subsequently, the prior work may broaden or restrict the number of user classifications under which the user is classified. Furthermore, the activity data of the user is examined to closely determine one or more suitable user classification from the predefined user classifications, for the user.

Optionally, the activity data of the user comprise information about one or more of: previous transactions performed by the user, browsing history of the user, ratings specified by the user to the document from the plurality of documents, and current work associated with the user. Specifically, the information about the previous transactions performed by the user may include information relating to documents previously purchased or sold by the user. Moreover, the information about the browsing history of the user includes a list of documents previously visited by the user. In an example, the user may have visited documents for pre-clinical trial reports relating to drugs. In such case, the browsing history will provide information relating to the documents visited by the user. Furthermore, the information about the ratings specified by the user to the document from the plurality of documents refers to a position provided to the document from the plurality of documents. The position may be provided on the basis of quality, relevance, accuracy, and so forth. Moreover, the position may be provided by way of a number of stars, a way of rank, and so forth. Furthermore, in an example, the information about the current work associated with the user may be provided by the user. In another example, the current work associated with the user may be extracted from the public domain.

In an embodiment, the predefined user classifications are defined based on the areas of interest of the user and areas of expertise of the user. In such case, examples of the predefined user classifications may include, but are not limited to, fields of engineering (such as electrical, electronics, biotechnology, computer science, chemical, civil, automobile, robotics, and so forth), fields of medical science (such as Obstetrics, Gynecology, Ophthalmology, Anesthesia, Pediatrics, General Medicine, Pathology, Microbiology, Forensic science, Pharmacology, Anatomy, Physiology, Cardiology, and so forth), and fields of commerce (such as Banking, Chartered Accountancy, Economics, Stock Broking, Agricultural Economics, and so forth). In an example, the areas of interest of the user may be Cardiology, General Medicine, Forensic science and Stock Broking. Moreover, the areas of expertise of the user may include Cardiology and General Medicine. Subsequently, the user may be primarily classified under user classification 'Cardiology', 'General Medicine', 'Forensic science', and 'Stock broking'. Furthermore, the prior work associated with the user may be classified under a document classification (discussed in detail later, herein) of 'Cardiology' and 'General Medicine'. Additionally, the activity data of the user may comprise information about a purchase of a documents under document classification 'Cardiology'. Subsequently, the user may be classified immutably under the user classification 'Cardiology'. Moreover, the user may be classified varyingly under the user classifications 'General Medicine', 'Forensic science', and 'Stock broking'.

It will be appreciated that a given user classification comprises a plurality of users. Furthermore, the plurality of users may or may not belong only to the given user classification. Subsequently, the plurality of users may belong to user classifications other than the given user classification. Moreover, the plurality of users belonging to the given user classification have a measure of similarity, owing to the given user classification.

The server arrangement determines the document classification for each of the plurality of documents, wherein the document classification for the given document is determined based on the metainformation pertaining to the given document. It will be appreciated that each of the plurality of documents and the meta data associated therewith are stored in the database arrangement of the system. Moreover, optionally, only the meta data associated with documents from the plurality of documents may be stored in the database arrangement.

Throughout the present disclosure, the term "document classification" refers to a segmentation of each of the plurality of documents under predefined document classifications, based on attributes relating to each of the plurality of documents and reference attributes of each of the predefined document classifications. Specifically, attributes relating to the given document from the plurality of documents (namely, the metainformation pertaining to the given document) are compared with reference attributes of each of the predefined document classifications in order to classify the given document under one or more document classification from the predefined document classifications. It will be appreciated that the given document is classified under a given document classification when the attributes relating to the given document are similar to reference attributes of the given document classification.

It will be appreciated that the document classification of each of the plurality of documents is determined based the metainformation pertaining to each of the plurality of documents. Optionally, the metainformation pertaining to each of the plurality of documents comprises information about one or more of: one or more authors, one or more owners, one or more publishers, a research organization, a statistical significance, a set of keywords, one or more research fields, a hypothesis, and a stage of applicable development. It will be appreciated that each of the plurality of documents comprise information stored therein. In an embodiment, the given document may be a research document relating to cancer. Subsequently, the information about the one or more authors, the one or more publishers, and the one or more owners of the given document may include information such as a name, an e-mail address, a mailing address, a contact number, and so forth associated with the one or more authors, the one or more publishers, and the one or more owners. Moreover, the information about the research organization may include information associated with an organization or an institution where the research work stored in the given document was performed. Furthermore, the information about the statistical significance include a significance such as path-breaking nature of the research work comprised in the given document, valuation of the research work comprised in the given document, and so forth. The set of keywords may include concepts or fields discussed in the given document such as lung cancer, breast cancer, stomach cancer, and so forth. The one or more research fields refer to the a subject or a concept on which the research work sored in the given document is performed. In an example, the research work stored in the given document may belong to the research field of medicine. Furthermore, the information about the hypothesis includes basic principles or protocols employed to perform the research work while the stage of applicable development refers to a stage for which the research work was performed. In an example, the research work may belong to 'pre-clinical trials' stage. In another example, the research work may belong to 'clinical trials' stage.

Optionally, the server arrangement analyzes each of the plurality of documents to determine the metainformation pertaining thereto. In an example, the plurality of documents are analyzed by employing frame semantic parsing technique to generate corresponding semantic frames. In such case, sentences present in each of the plurality of documents are parsed and processed to generate the semantic frames. Optionally, the semantic frames form information indicative of each of the plurality of documents and semantic inter-relationships specific to each of the plurality of documents.

Optionally, the information indicative of each of the plurality of documents and semantic inter-relationships specific to each of the plurality of documents is stored at the database arrangement of the system or a data repository of the server arrangement. Optionally, the data repository of the server arrangement is implemented by way of data memory associated with the processor of the server arrangement. Alternatively, optionally, the data repository is implemented by way of a database arrangement associated with the server arrangement, wherein the database arrangement comprises one or more databases.

Optionally, the processor of the server arrangement executes machine readable instructions that cause the server arrangement to compare each of the plurality of documents and semantic inter-relationships specific to each of the plurality of documents by using graphs. Optionally, said comparison is performed to identify the metainformation pertaining to each of the plurality of documents.

In an embodiment, the metainformation pertaining to a document may be extracted from meta data associated with the document. Subsequently, the document classification of the meta data associated with the document is determined based on the metainformation of the meta data. It will be appreciated that the document classification of the document is same as the document classification of the meta data of the document.

In an embodiment, the predefined document classifications are defined based on the one or more research field of the given document. In such case, examples of the predefined document classifications may include, but are not limited to, fields of engineering (such as electrical, electronics, biotechnology, computer science, chemical, civil, automobile, robotics, and so forth), fields of medical science (such as Obstetrics, Gynecology, Ophthalmology, Anesthesia, Pediatrics, General Medicine, Psychology, Pathology, Microbiology, Forensic science, Pharmacology, Anatomy, Physiology, Cardiology, and so forth), and fields of commerce (such as Banking, Chartered Accountancy, Economics, Stock Broking, Agricultural Economics, and so forth). In an example, for a given document comprising a research work, name of author may be 'Alice', name of research organization where the research work was performed may be 'ABC university', statistical significance of the given document may be defined using a 0.06 P-value, set of keywords associated with the given document may include 'abnormal behavior', 'functionalism', 'educational psychology', 'clinical psychology', 'counseling psychology' and 'addiction'. Furthermore, research field of the given document may be 'behavior' and 'psychology', hypothesis of the given document may be 'Alternative Hypothesis', and stage of applicable development may be 'Generalization'. Subsequently, the given document may be classified under the document classification 'Psychology' and 'Psychiatry'.

It will be appreciated that a given document classification comprises a plurality of documents. Furthermore, the plurality of documents may or may not belong only to the given document classification. Subsequently, the plurality of documents may belong to document classifications other than the given user classification. Moreover, the plurality of documents belonging to the given document classification have a measure of similarity, owing to the given document classification.

Optionally, the user classification of the user and the document classification of each of the plurality of documents is determined by employing collaborative filtering techniques. Specifically, the parameters associated with the user and the attributes relating to each of the plurality of documents are analyzed to generate a measure of similarity. It will be appreciated that the measure of similarity for classification of the user and each of the plurality of documents is ordinary skill in the field of collaborative filtering. Beneficially, the measure of similarity can be altered by the server arrangement of the system to closely classify the user and each of the plurality of documents under suitable user classification and document classification, respectively.

For illustration purposes only, an optimization function is employed for determining the user classification of the user and the document classification of the given document. Furthermore, the optimization function is minimized to reduce error in determining the user classification of the user and the document classification of the given document. It will be appreciated that minimization of the optimization function is performed iteratively for each of the plurality of documents, but is done simultaneously for attributes relating to the given document and parameters associated with the user. Furthermore, optionally, machine learning algorithms are executed by the server arrangement for minimization of the optimization function of the collaborative filtering technique.

The exemplary formula for the optimization function of the collaborative filtering technique using cost function can be represented as follows:

Initially, $x(1), x(2), \ldots, x(N_m)$ and $\theta(1), \theta(2), \ldots, \theta(N_u)$ are initialized to small random variables.

$$J(x(1),x(2), \ldots ,x(N_m),\theta(1),\theta(2), \ldots ,\theta(N_u))=\tfrac{1}{2}\Sigma_{(i,j):r(i,j)=1}(\theta(j)T_x(i)-y(i,j))2+\lambda/2\Sigma i=1 \text{ to } N_m \Sigma j=1 \text{ to } N_u(xk(i))2+\lambda/2\Sigma\Sigma^{(\theta k(j))2}$$

Furthermore, the $J(x(1), x(2), \ldots, x(N_m), \theta(1), \theta(2), \ldots, \theta(N_u))$ is minimized using gradient descent.

Therefore, for every $j=1, 2, \ldots, N_u$; and $i=1, 2, \ldots, N_m$;

$$xk=xk-\alpha(\Sigma j:r(i,j)=1(((\theta(j)T_x(i)-y(i,j))\theta k(j))+\lambda x(i));$$
and $$\theta k=\theta k-\alpha(\Sigma j:r(i,j)=1(((\theta(j)T_x(i)-y(i,j))\times k(j))+\lambda \theta(i)),$$

wherein
$N_m$ is the number of plurality of documents;
$N_u$ is the plurality of users of the system described herein;
$\alpha$ is a learning rate of the machine learning algorithms;
$\lambda$ is a regularization term of the machine learning algorithms;
$x(1), x(2), \ldots, x(N_m)$ are attributes relating to the given document;
$\theta(1), \theta(2), \ldots, \theta(N_u)$ are parameters associated with the user; and
$\theta T_x$ is a prediction value for the user having $\theta$ parameters associated with the user and the given document having x attributes relating to the given document.

Furthermore, the 'x k' and the 'θ K' are executed simultaneously for a given value of i and j to obtain minimized values.

It will be appreciated that the user classification of the user and the document classification of the given document can be determined using other suitable techniques.

The server arrangement of the system determines the relevance factor for each of the plurality of documents with respect to the user, wherein the relevance factor of a given document is determined based on the document classification of the given document, the user classification of the user, and activity data relating to the given document of a plurality of users with similar user classification as the user. Throughout the present disclosure, the term "relevance factor" refers to a rating (namely, a grade or a value) that is determined for each of the plurality of documents, wherein the relevance factor is indicative of a quantified importance for each of the plurality of documents from a technical point of view of the user. Thus, the relevance factor helps the system in deciding an importance of each of the plurality of documents with respect to the user. Furthermore, the relevance factor is used to determine the at least one document from the plurality of documents that is to be recommended to the user. Moreover, the relevance factor can be used to provide the user with a guidance for more suitable document and/or documents belonging to a more suitable document classification, for performing various actions or commercial transactions such as purchasing of the document, leasing the document, and so forth.

The relevance factor is determined based on the document classification of the given document, the user classification of the user, and the activity data relating to the given document of the plurality of users with similar user classification as the user. In other words, the relevance factor for the given document is determined with respect to the user classification of the user. Specifically, the parameters associated with the user classified under a given user classification is compared with the attributes relating to a given document classified under a given document classification. More specifically, a measure of similarity is determined between the user classified under the given user classification and the given document classified under the given document classification. Subsequently, the given document is recommended to the user upon obtaining a relevance factor higher than a threshold, wherein the threshold may be predefined or defined dynamically on the basis of the relevance factor calculated for each of the plurality of documents with respect to the user. Furthermore, the relevance factor is determined based on activity data relating to the given document of the plurality of users classified under the given user classification.

Typically, the user is classified under the given user classification that further has a plurality of users classified therein. It will be appreciated that the plurality of users classified under the given user classification has a positive measure of similarity with respect to the user. Moreover, the user may be classified under one or more user classifications. Subsequently, the plurality of user classified under the one or more user classifications, have a positive measure of similarity with respect to the user. Thus, the activity data of the plurality of users having positive measure of similarity with respect to the user on the given document, is analyzed to determine the relevance factor for the given document with respect to the user.

Optionally, in this regard, said comparison is performed by identifying common entities and semantic inter-relationships therein (namely, entities and semantic inter-relationships that are common between the parameters associated with the user classified under the given user classification with the attributes relating to the given document classified under the given document classification) and new semantic inter-relationships. Notably, new semantic inter-relationship(s) potentially indicate that the given document from the plurality of documents is groundbreaking.

In an example, the user may belong to a user classification 'Pediatrics' based on field of expertise and 'General Medicine' based on field of interest. Subsequently, at least one document classified under the document classification 'Pediatrics' will have a high relevance factor with respect to the user. Moreover, at least one document classified under the document classification 'General Medicine' will have a significant relevance factor with respect to the user. Furthermore, activity data of plurality of users classified under the user classification 'Pediatrics' and 'General Medicine' such as a rating provided by the plurality of users to the at least one document, transactions performed on the at least one document by the plurality of users, and so forth are analyzed to determine the relevance factor for the at least one document classified under the document classification 'Pediatrics' and 'General Medicine'.

The server arrangement of the system provides recommendations of the at least one document from the plurality of documents to the user based on the relevance factors of the plurality of documents. Specifically, the system provides recommendations of the at least one document from the plurality of documents to the user based on the threshold of the relevance factor. It will be appreciated that documents from the plurality of documents stored in the database arrangement of the system having a low measure of similarity with respect to the user will have a low relevance factor.

Optionally, the relevance factor may be a value between 0 and 1. More optionally, the threshold of the relevance factor may be 0.5. In such case, the at least one document having high measure of similarity with respect to the user has a relevance factor higher than the threshold relevance factor. Alternately, optionally, documents from plurality of documents other than the at least one document may have a relevance factor less than 0.5. Subsequently, the at least one document from the plurality of documents having a higher relevance factor than the threshold relevance factor is recommended to the user.

For illustration purposes only, there will now be considered an example network environment, wherein a system, that when operated, provides recommendations of documents to a user is implemented pursuant to embodiments of the present disclosure. One such network environment has been illustrated in conjunction with FIG. 1 as explained in more detail below.

Figure 1:
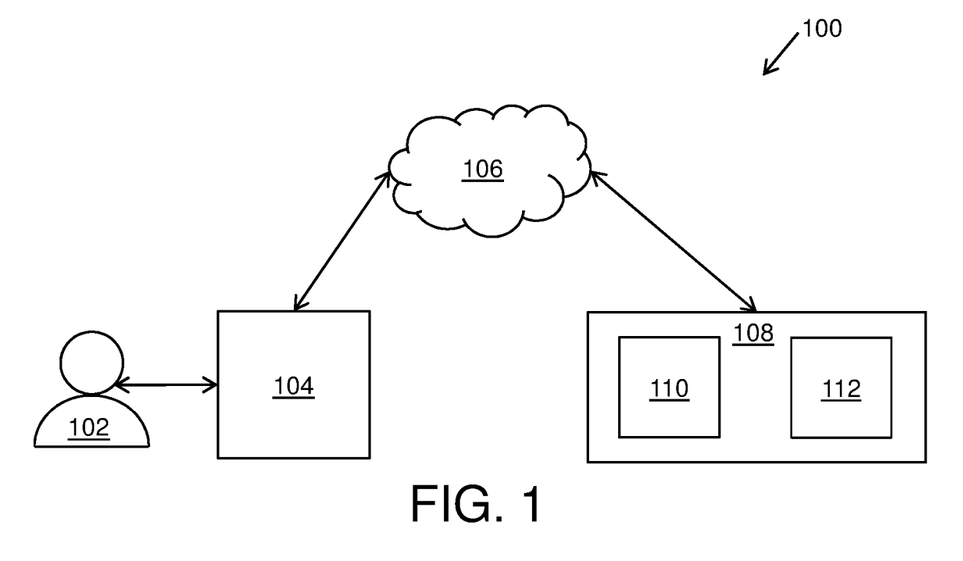
FIG. 1 is a schematic illustration of a network environment, wherein a system, that when operated, provides recommendations of documents to a user, is implemented, in accordance with an embodiment of the present disclosure.

The network environment includes a user, a client device of the user, a server arrangement of the system, a database arrangement of the system, and one or more data communication networks. The server arrangement, comprising one or more processors, is communicably coupled via the one or more data communication networks with the client device of the user. Optionally, the network environment also includes a plurality of database servers (namely, the public domain) communicably coupled via the one or more data communication networks with the one or more processors of the server arrangement.

The one or more data communication networks can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

Examples of the client device of the user include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, large-sized touch screens with embedded PCs, a server, and Network-Attached Storage (NAS) devices.

The one or more processors of the server arrangement are configured to execute machine readable instructions that cause the server arrangement to perform operations, for example, as illustrated with respect to the aforementioned aspect.

Moreover, the present description also relates to the method as described above. The various embodiments and variants disclosed above apply mutatis mutandis to the method.

Optionally, the user further validates an authorship of the prior work associated with the user.

Optionally, the method comprises requesting a consent from the user for extracting the prior work associated with the user.

Optionally, the method comprises analyzing each of the plurality of documents to determine the metainformation pertaining thereto.

DETAILED DESCRIPTION OF THE DRAWINGS

Referring to FIG. 1, illustrated is a schematic illustration of a network environment 100, wherein a system, that when operated, provides recommendations of documents to a user, is implemented, in accordance with an embodiment of the present disclosure. The network environment 100 comprises a user 102, a client device 104, and the system that provides recommendations of documents to the user 108. The client device 104 is coupled to the user 102. The system 108 is communicably coupled via one or more data communication networks (depicted as a data communication network 106) with the client device 104.

The system that provides recommendations of documents to the user 108 comprises a server arrangement 110, and a database arrangement 112 that stores a plurality of documents.

FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of server arrangements, client devices, data communication networks and ontological databanks. A person skilled in the art will recognize many variations, alternatives, and modifications of embodiments of the present disclosure.

Figure 2A:
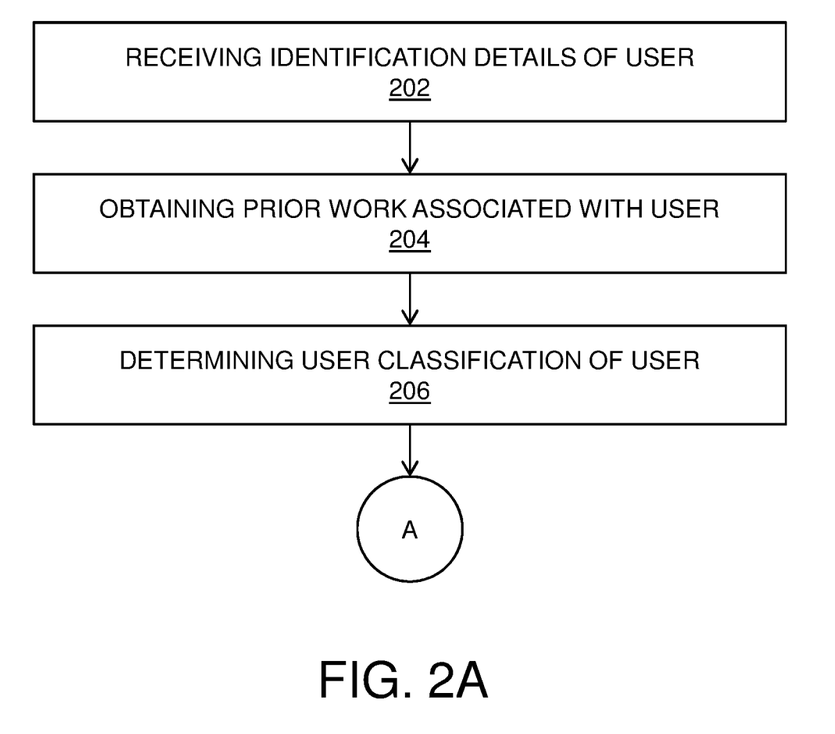
FIGS. 2A and 2B collectively depict a flow chart depicting steps of a method for providing recommendations of documents to a user, in accordance with an embodiment of the present disclosure.
Figure 2B:
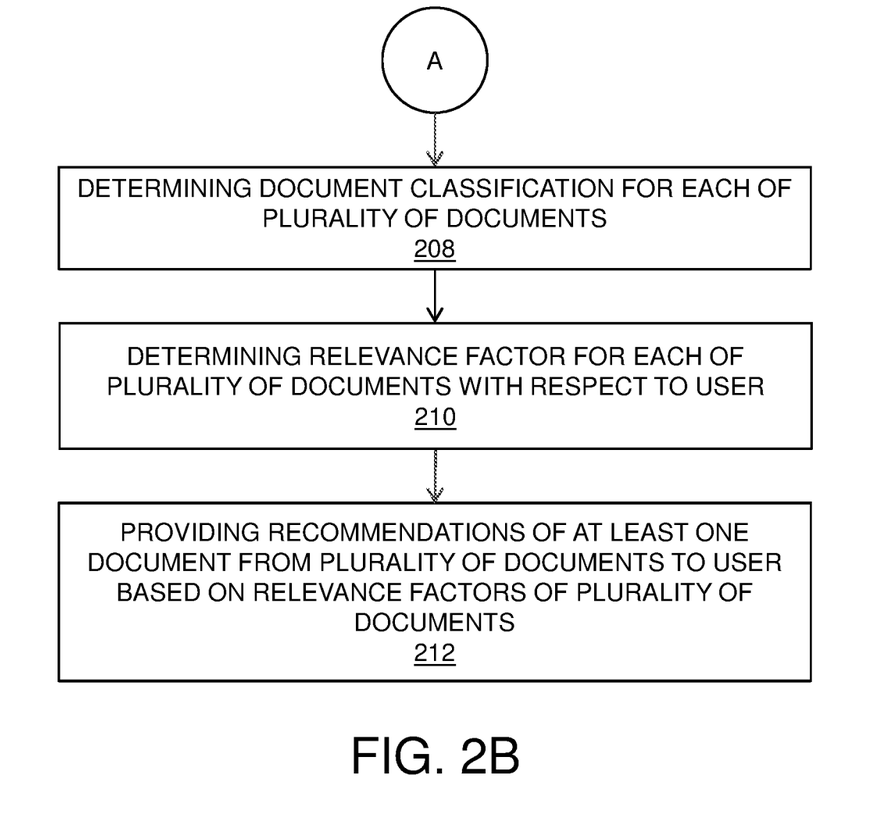

Referring to FIGS. 2A and 2B, illustrated is a flow chart depicting steps of a method for providing recommendations of documents to a user, in accordance with an embodiment of the present disclosure. The method is depicted as a collection of steps in a logical flow diagram, which represents a sequence of steps that can be implemented in hardware, software, or a combination thereof, for example as aforementioned.

The method is implemented via a system comprising a server arrangement including one or more processors, and a database arrangement that stores a plurality of documents. The system is communicably coupled via one or more data communication networks with a client device.

At a step 202, identification details of the user are received from the user. At a step 204, prior work associated with the user is obtained. At a step 206, a user classification of the user is determined. The user classification of the user is determined based on at least one of: the identification details of the user, the prior work associated with the user, and an activity data of the user. At a step 208, a document classification for each of the plurality of documents is determined. The document classification for a given document is determined based on a metainformation pertaining to the given document. At a step 210, a relevance factor for each of the plurality of documents with respect to the user is determined. The relevance factor of a given document is determined based on the document classification of the given document, the user classification of the user, and activity data relating to the given document of a plurality of users with similar user classification as the user. At a step 212, recommendations of at least one document from the plurality of documents to the user based on relevance factors of the plurality of documents is provided.

The steps 202 to 212 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system, that when operated, provides recommendations of documents to a user, the system comprising a server arrangement, and a database arrangement that stores a plurality of documents, wherein the server arrangement:
receives, from the user, identification details of the user;
obtains prior work associated with the user, wherein the prior work refers to published and/or authored or co-authored documents of the user;
determines, a user classification of the user, wherein the user classification of the user is determined based on one or more parameters associated with the user comprising: the identification details of the user, the prior work associated with the user, and an activity data of the user, wherein the one or more parameters associated with the user are compared with reference parameters of each of predefined user classifications to classify the user under one or more of the user classification from the predefined user classifications, wherein the user is classified under a given user classification when the one or more parameters associated with the user are similar to the reference parameters of the given user classification, wherein the predefined user classifications are defined based on areas of interest of the user and areas of expertise of the user;
determines, a document classification for each of the plurality of documents, wherein the document classification for a given document is determined based on a metainformation pertaining to the given document, wherein the metainformation pertaining to the given document from the plurality of documents are compared with reference metainformation of each of predefined document classifications to classify the given document under one or more document classification from the predefined document classifications, wherein the given document is classified under a given document classification when the metainformation pertaining to the given document are similar to the reference metainformation of the given document classification, wherein the predefined document classifications are defined based on one or more research field of the given document;
determines, a relevance factor for each of the plurality of documents with respect to the user, wherein the relevance factor for the given document is determined with respect to the user classification of the user, wherein a measure of similarity is determined between the user classified under the given user classification and the given document classified under the given document classification and wherein the relevance factor is determined based on an activity data relating to the given document of a plurality of users classified under the given user classification; and
provides recommendations of at least one document from the plurality of documents to the user based on the relevance factors of each of the plurality of documents.

2. The system of claim 1, wherein the user further validates an authorship of the prior work associated with the user, using the server arrangement.

3. The system of claim 1, wherein the server arrangement requests a consent from the user for extracting the prior work associated with the user.

4. The system of claim 1, wherein the server arrangement analyzes each of the plurality of documents to determine the metainformation pertaining thereto.

5. The system of claim 1, wherein the metainformation pertaining to each of the plurality of documents comprises information about one or more of: one or more authors, one or more owners, one or more publishers, a research organization, a statistical significance, a set of keywords, one or more research fields, a hypothesis, and a stage of applicable development.

6. The system of claim 1, wherein the identification details of the user comprise information about one or more of: name or unique identifier of the user, academic qualifications of the user, academic institutes from where the user obtained the academic qualifications, research organizations and/or departments to which the user is affiliated, areas of expertise of the user, areas of interest of the user, digital libraries where the user have made publications.

7. The system of claim 1, wherein the activity data of the user comprise information about one or more of: previous transactions performed by the user, browsing history of the user, ratings specified by the user to a document from the plurality of documents, and current work associated with the user.

8. A method of providing recommendations of documents to a user, wherein the method is implemented via a system comprising a server arrangement, and a database arrangement that stores a plurality of documents, the method comprising:
receiving, from the user, identification details of the user;
obtaining prior work associated with the user, wherein the prior work refers to published and/or authored or co-authored documents of the user;
determining, a user classification of the user, wherein the user classification of the user is determined based on one or more parameters associated with the user comprising:
the identification details of the user, the prior work associated with the user, and an activity data of the user, wherein the one or more parameters associated with the user are compared with reference parameters of each of predefined user classifications to classify the user under one or more of the user classification from the predefined user classifications, wherein the user is classified under a given user classification when the one or more parameters associated with the user are similar to the reference parameters of the given user classification, wherein the predefined user classifications are defined based on areas of interest of the user and areas of expertise of the user;
determining, a document classification for each of the plurality of documents, wherein the document classification for a given document is determined based on a metainformation pertaining to the given document, wherein the metainformation pertaining to the given document from the plurality of documents are compared with reference metainformation of each of predefined document classifications to classify the given document under one or more document classification from the predefined document classifications, wherein the given document is classified under a given document classification when the metainformation pertaining to the given document are similar to the reference metainformation of the given document classification, wherein the predefined document classifications are defined based on one or more research field of the given document;

determining, a relevance factor for each of the plurality of documents with respect to the user, wherein the relevance factor for the given document is determined with respect to the user classification of the user, wherein a measure of similarity is determined between the user classified under the given user classification and the given document classified under the given document classification, and wherein the relevance factor is determined based on an activity data relating to the given document of a plurality of users classified under the given user classification; and providing recommendations of at least one document from the plurality of documents to the user based on the relevance factors of each of the plurality of documents.

9. The method of claim 8, wherein the user further validates an authorship of the prior work associated with the user.

10. The method of claim 8, wherein the method comprises requesting a consent from the user for extracting the prior work associated with the user.

11. The method of claim 8, wherein the method comprises analyzing each of the plurality of documents to determine the metainformation pertaining thereto.

* * * * *